(12) United States Patent
Huang (10) Patent No.: US 9,304,929 B2
(45) Date of Patent: Apr. 5, 2016

(54) STORAGE SYSTEM HAVING TAG STORAGE DEVICE WITH MULTIPLE TAG ENTRIES ASSOCIATED WITH SAME DATA STORAGE LINE FOR DATA RECYCLING AND RELATED TAG STORAGE DEVICE

(71) Applicant: MediaTek Singapore Pte. Ltd., Singapore (SG)

(72) Inventor: Hsilin Huang, Cupertino, CA (US)

(73) Assignee: MediaTek Singapore Pte. Ltd., Solaris, Singapore (SG)

(*) Notice: Subject to any disclaimer, the term of this patent is extended or adjusted under 35 U.S.C. 154(b) by 258 days.

(21) Appl. No.: 14/061,765

(22) Filed: Oct. 24, 2013

(65) Prior Publication Data

US 2015/0121011 A1    Apr. 30, 2015

(51) Int. Cl.
*G06F 12/06*     (2006.01)
*G06F 12/08*     (2006.01)

(52) U.S. Cl.
CPC .......... *G06F 12/0864* (2013.01); *G06F 12/082* (2013.01); *G06F 12/0851* (2013.01); *G06F 12/0886* (2013.01); *G06F 12/0895* (2013.01)

(58) Field of Classification Search
CPC ............ G06F 12/0802; G06F 12/0864; G06F 12/0895; G11C 15/00
See application file for complete search history.

(56) References Cited

U.S. PATENT DOCUMENTS

| 2007/0186036 | A1* | 8/2007  | Bittner  | G11C 15/00 711/108 |
| 2008/0292276 | A1  | 11/2008 | Horvath  |                    |
| 2011/0082980 | A1  | 4/2011  | Gschwind |                    |
| 2011/0283041 | A1* | 11/2011 | Kanoh    | G06F 12/0842 711/3 |
| 2012/0265943 | A1  | 10/2012 | Koob     |                    |

FOREIGN PATENT DOCUMENTS

EP    2 492 818 A1    8/2012

\* cited by examiner

*Primary Examiner* — Ryan Bertram
(74) *Attorney, Agent, or Firm* — Winston Hsu; Scott Margo (57) ABSTRACT

A storage system has a data storage device, a tag storage device and a controller. The tag storage device has a plurality of first tag entries and a plurality of second tag entries, wherein each of the first tag entries is associated with one data storage line allocated in the data storage device. The controller is coupled between the data storage device and the tag storage device, and arranged to set a specific second tag entry in the tag storage device to associate with a specific data storage line with which a specific first tag entry in the tag storage device is associated.

18 Claims, 5 Drawing Sheets

STORAGE SYSTEM HAVING TAG STORAGE DEVICE WITH MULTIPLE TAG ENTRIES ASSOCIATED WITH SAME DATA STORAGE LINE FOR DATA RECYCLING AND RELATED TAG STORAGE DEVICE

BACKGROUND

The disclosed embodiments of the present invention relate to accessing buffered data (e.g., cached data), and more particularly, to a storage system having multiple tag entries associated with the same data storage line (e.g., the same cache line) for data recycling and related tag storage device.

In today's systems, the time it takes to bring data (e.g., instructions) into a processor is very long when compared to the time to process the data. Therefore, a bottleneck forms at the input to the processor. The cache memory helps by decreasing the time it takes to move information to and from the processor. When the cache memory contains the information requested, the transaction is said to be a cache hit. When the cache memory does not contain the information requested, the transaction is said to be a cache miss. In general, the hit rate is a critical performance index of the cache memory. How to increase the hit rate has become an issue in the field.

The cache memory may be a fully associative cache, a direct-mapped cache, or a set-associative cache. The set-associative cache is a hybrid between the fully associative cache and the direct-mapped cache, and may be considered a reasonable compromise between the hardware complexity/latency of the fully associative cache and the direct-mapped cache. To increase the hit rate of the set-associative cache, the conventional design may try to increase ways of a set. But there is a limited benefit to increase ways of a set. For example, when the number of ways of a set is changed from 8 to 16, the hit rate will not increase too much, but the gate count and complexity will increase. Besides increasing the ways of a set, the conventional design may modify the replacement rule employed. But it also hit to the limitation for increasing the hit rate.

SUMMARY

In accordance with exemplary embodiments of the present invention, a storage system having multiple tag entries associated with the same data storage line (e.g., the same cache line) for data recycling and related tag storage device are proposed.

According to a first aspect, an exemplary storage system includes a data storage device, a tag storage device and a controller. The tag storage device has a plurality of first tag entries and a plurality of second tag entries, wherein each of the first tag entries is associated with one data storage line allocated in the data storage device. The controller is coupled between the data storage device and the tag storage device, and arranged to set a specific second tag entry in the tag storage device to associate with a specific data storage line with which a specific first tag entry in the tag storage device is associated.

According to a second aspect, a tag storage device has a plurality of first tag entries and a plurality of second tag entries, wherein each of the first tag entries is associated with one data storage line allocated in a data storage device, and a specific second tag entry is set to associate with a specific data storage line with which a specific first tag entry is associated.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The concept of the present invention is to use a spare tag entry (e.g., a recycling tag) to associate with a data storage line (e.g., a cache line) which is associated with a tag entry (e.g., a main tag) selected by a replacement rule for a cache miss event. Hence, before the data storage line is updated by fetched data provided by another data storage (e.g., a main memory or a next-level cache), a cache hit event may occur by comparing the spare tag entry with another incoming address, and the original data currently maintained in the data storage line is fetched and then returned to a processor in response to the cache hit event. In this way, the original data stored in the data storage line is recycled before phased out, which increases the hit rate and reduces the memory traffic. Further details are described as below.

Figure 1:
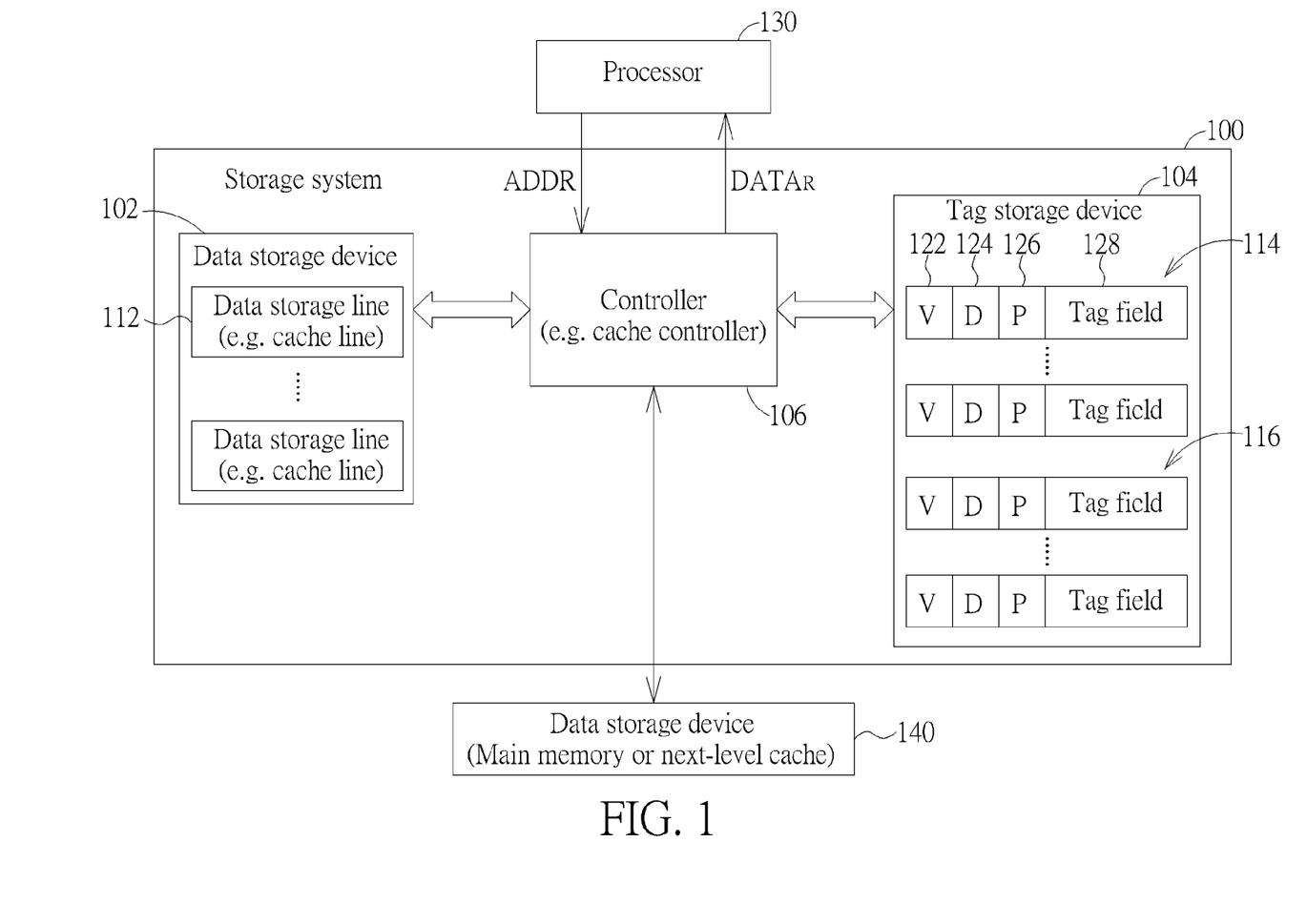
FIG. 1 is a diagram illustrating a storage system according to an embodiment of the present invention.

Please refer to FIG. 1, which is a diagram illustrating a storage system according to an embodiment of the present invention. The storage system 100 may a cache memory (e.g., a memory device with a faster data access speed) implemented in a graphics system or any application requiring faster information transaction between a processor and a storage device (e.g., a memory device with a slower data access speed). In this embodiment, the storage system 100 includes a data storage device 102, a tag storage device 104 and a controller 106. The data storage device 102 includes a plurality of data storage lines 112. For example, the data storage device 102 is implemented using a static random access memory (SRAM) used for storing cached data, and each of the data storage lines 112 is a cache line with a designated cache line size. The tag storage device 104 may be a tag RAM having a plurality of first tag entries 114 and a plurality of second tag entries 116 stored therein. By way of example, the data storage device 102 and the tag storage device 104 may be allocated in different storage spaces of the same memory. Alternatively, the data storage device 102 and the tag storage device 104 may be allocated in distinct memories.

For clarity and simplicity, a cache memory is used as an example of the storage system 100 to describe technical features of the present invention. Hence, in the following, "data storage line" and "cache line" are interchangeable. However, the proposed recycling tag design is not limited to a cache application only. Any data storage/buffer using the proposed recycling tag design to allow a single data storage line to be associated with multiple tag entries falls within the scope of the present invention.

In this embodiment, each of the first tag entries 114 acts as a main tag associated with one cache line 112 allocated in the data storage device 102. With regard to the second tag entries 116, each of the second tag entries 116 may be used to act as a spare tag (e.g., a recycling tag). For example, when the cache line size is programmed by the controller 106 to have a first value, each of the second tag entries 116 may act as a main tag associated with one cache line 112 allocated in the data storage device 102; and when the cache line size is programmed by the controller 106 to have a second value larger than the first value, each of the second tag entries 116 may act as a spare tag (e.g., a recycling tag). In other words, the second tag entries 116 serve as main tags or spare tags, depending upon the configuration of the data storage device 102 programmed by the controller 106. However, this is for illustrative purposes only, and is not meant to be a limitation of the present invention. In an alternative design, each of the second tag entries 116 may be implemented to act as a dedicated recycling tag only. This also falls within the scope of the present invention. When the second tag entries 116 serve as recycling tags, the second tag entries 116 may be regarded as a duplicate of the first tag entries 114, and can be used to store tag contents of the first tag entries 114 when needed.

Each of the first tag entries 114 and second tag entries 116 has a plurality of status bits (e.g., a valid bit "V" 122, a dirty bit "D" 124 and a pending bit "P" 126) and a tag field 128. The valid bit 122 records whether or not the cache line 112 associated with this tag entry contains valid data. The valid bit 122 of each tag entry is initially set to indicate an invalid state (i.e., V=0). When data fetched from the data storage device (e.g., main memory or next-level cache) 140 is stored into a cache line 112, the valid bit 122 of a corresponding tag entry associated with this cache line 112 is set to indicate a valid state (i.e., V=1). The dirty bit 124 records whether or not the cached data associated with this tag entry should be written back to a main memory. It should be noted that the dirty bits 124 are used by write-back cache only. When the storage system 100 is a write-through cache, the dirty bit 124 in each tag entry is omitted. The pending bit 126 records whether or not this tag entry is waiting for data fetched from the data storage device 140 due to a cache miss. The pending bit 126 of each tag entry is initially set to indicate a non-pending state (i.e., P=0). In this embodiment, even though the pending bit 126 of one specific tag entry is set to indicate that the specific tag entry enters a pending state (i.e., P=1), a cache line 112 associated with this specific tag entry is still accessible due to a recycling tag (i.e., one of the second tag entries 116) which is particularly set to associate with the cache line 112. Further details directed to recycling the cache line data will be described later. Regarding the tag field 128, it contains a portion of an address corresponding to data stored in a cache line 112 associated with this tag entry.

The controller 106 is coupled between the data storage device 102 and the tag storage device 104, and is arranged to control the operation of the storage system 100. For example, the controller 106 may be a cache controller which snoops the bus activities of the processor 130, and determines if an address ADDR for requested data $DATA_R$ causes a cache hit or a cache miss. When a cache hit is identified by the controller 106, the controller 106 fetches the requested data $DATA_R$ from one cache line 112 and returns the requested data $DATA_R$ to the processor 130. When a cache miss is identified by the controller 106, the controller 106 follows a replacement rule to update one cache line 112 and associated tag entry, and returns the requested data $DATA_R$ fetched from the data storage device 140 to the processor 130.

Figure 2:
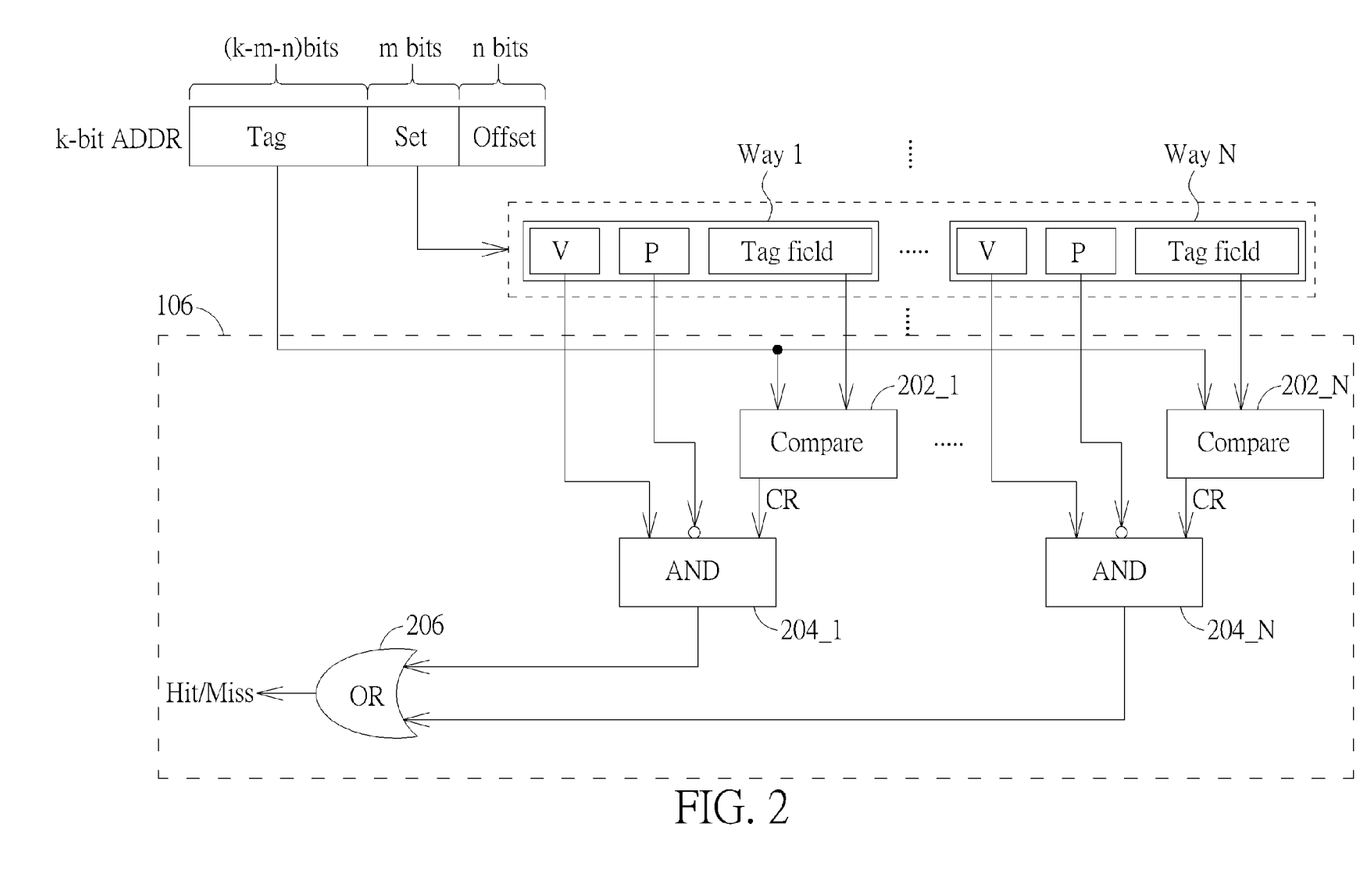
FIG. 2 is a diagram illustrating an example of the decision logic used for detecting cache hit/miss in the storage system shown in FIG. 1.

Please refer to FIG. 2, which is a diagram illustrating an example of the decision logic used for detecting cache hit/miss in the storage system 100 shown in FIG. 1. Assume that the storage system 100 is an N-way set associative cache, the capacity of the data storage device 102 is M bytes, the cache line size of each cache line 112 is P bytes, and the processor 130 uses a k-bit address ADDR. Hence, the number of cache lines $N_{CL}$ allocated in the data storage device 102 is equal to M/P; the number of sets $N_s$ in the N-way set associative cache is equal to $N_{CL}/N$; the number of addressing bits m to select a set is equal to $\log_2 N_s$; and the number of addressing bits n corresponding to bytes within the same cache line is equal to $\log_2 P$. The remainder of the k-bit address ADDER serves as a tag of a cache line. Thus, the tag field in each tag entry would have (k−m−n) bits. If there are j status bits (e.g., valid bit, dirty bit and/or pending bit), each tag entry would have (k−m−n)+j bits. When each cache line is associated with one tag entry (i.e., one main tag), the tag storage device 104 is required to have the capacity of $[(k-m-n)+j] \times N_{CL}$ bits.

As shown in FIG. 2, the addressing bits ADDR[0]-ADDR[n−1] represent an offset which is not used for cache hit/miss determination; the addressing bits ADDR[n]-ADDR[m+n−1] are used by the controller 106 to select one of the $N_s$ sets in the N-way set associative cache; and the addressing bits ADDR[m+n]-ADDR[k−1] represent a requested tag which would be compared with tag contents of tag fields in all tag entries belonging to the selected set through compare circuits 202_1-202_N, respectively. A comparison output CR of a compare circuit would be set by "1" when the requested tag matches a tag content stored in a tag entry; and the comparison output CR of the compare circuit would be set by "0" when the requested tag does not match the tag content stored in the tag entry. Comparison outputs CR of compare circuits 202_1-202_N are fed into a plurality of AND gates 204_1-204_N, respectively. A logic output of an AND gate depends on the received comparison result and status bits (e.g., valid bit and pending bit) of the corresponding tag entry. In this embodiment, the logic output of an AND gate is set by "1" only when V=1, P=0 and CR=1. Based on the logic outputs of AND gates 204_1-204_N, the OR gate 206 would indicate whether there is a cache hit or a cache miss.

In a preferred embodiment, the controller 106 of the present invention is capable of programming a cache line size of each cache line allocated in the data storage device 102 according to the application/computing requirement. As the cache line size is programmable, some of the tag entries would become spare tags when the controller 106 changes the cache line size to a larger value. For example, the cache line size of each cache line 112 may be programmed to be P' bytes, where P'>P. Hence, the number of cache lines $N_{CL}'$ allocated in the data storage device 102 is equal to M/P', where M/P'<M/P. The number of sets $N_s'$ in the N-way set associative cache is equal to $N_{CL}'/N$, where $N_{CL}'/N<N_{CL}/N$. The number of addressing bits m' to select a set is equal to $\log_2 N_s'$, where m'<m. The number of addressing bits n' corresponding to bytes within the same cache line is $\log_2 P'$, where $n'>n$. Thus, the tag field in each tag entry would have $(k-m'-n')$ bits. In one exemplary design, $(k-m'-n')$ may be equal to $(k-m-n)$ due to $m'<m$ and $n'>n$. As mentioned above, $N_{CL}'$ is smaller than $N_{CL}$, meaning that only some of the $N_{CL}$ tag entries are needed to serve as the $N_{CL}'$ main tags associated with $N_{CL}'$ cache lines each having a larger cache line size $P'$. In this embodiment, the remaining tag entries of the $N_{CL}$ tag entries can be used to act as recycling tags for cache line data recycling.

For example, regarding a 64 KB SRAM with 128-byte cache lines and 4 ways set-associativity, the number of cache lines is equal to 64K bytes/128 bytes (i.e., 64*1024/128=512), the number of sets is equal to $\log_2 (512/4)=7$, and the number of addressing bits for 128 bytes within the same cache line is equal to $\log_2 (128)=7$. Besides, the tag entry size is equal to 32−(7+7)+2=20 if 32-bit memory addressing is used and each tag entry has two status bits (e.g., one valid bit and one pending bit). Regarding a 64 KB SRAM with 64-byte cache lines and 4 ways set-associativity, the number of cache lines is equal to 64K bytes/64 bytes (i.e., 64*1024/64=1024), the number of sets is equal to $\log_2 (1024/4)=8$, and the number of addressing bits for 64 bytes within the same cache line is equal to $\log_2 (64)=6$. Besides, the tag entry size is equal to 32−(8+6)+2=20 if 32-bit memory addressing is used and each tag entry has two status bits (e.g., one valid bit and one pending bit). To design a configurable/programmable cache line size, the total number of cache lines 102 will be changed due to the fact that the capacity of the data storage device 102 is fixed. For a cache line size of 128 bytes, 512 tag entries are needed to associate with 512 cache lines allocated in the data storage device 102, where the tag entry size is 20 bits. For a cache line size of 64 bytes, 1024 tag entries are needed to associate with 1024 cache lines allocated in the data storage device 102, where the tag entry size is also 20 bits. It should be noted that, compared to the number of main tags needed by the cache memory with the 128-byte cache line size, the number of main tags needed by the cache memory with the 64-byte cache line size is doubled. To support both of the 128-byte cache line size and the 64-byte cache line size, the tag storage device 104 may be implemented using an SRAM with a capacity equal to 1024*20 bits. In a preferred embodiment, the tag entries in the tag storage device 104 may be categorized into even tags and odd tags. By way of example, but not limitation, the first tag entries 114 shown in FIG. 1 are even tags, and the second tag entries 116 shown in FIG. 1 are odd tags. When 64-byte cache line size and 32-bit memory addressing are used, the addressing bit ADDR[6] is referenced by the controller 106 to select even tags or odd tags for tag matching detection (i.e., cache hit/miss test). For example, when ADDR[6]=0, the controller 106 selects even tags to do tag matching detection; and when ADDR[6]=1, the controller 106 selects odd tags to do tag matching detection. When 128-byte cache line size is used, only even tags are used as main tags, while odd tags are used as recycling tags. The details of recycling cache line data for increasing the hit rate and reducing the memory traffic are described as below.

Figure 3:
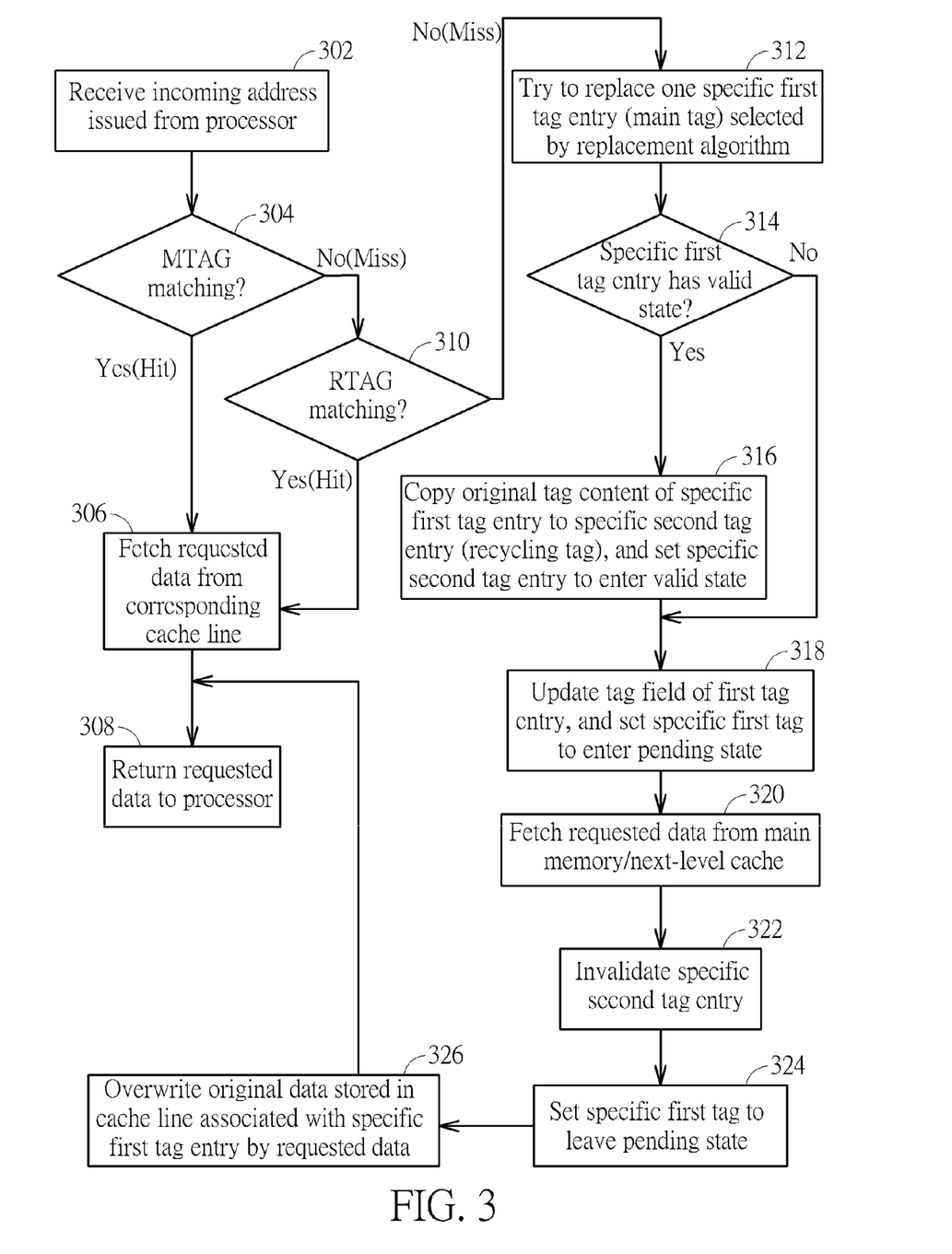
FIG. 3 is a flowchart illustrating a read operation performed by the storage system shown in FIG. 1.

FIG. 3 is a flowchart illustrating a read operation performed by the storage system 100 shown in FIG. 1 according to an embodiment of the present invention. Provided that the result is substantially the same, the steps are not required to be executed in the exact order shown in FIG. 3. In step 302, the controller 106 receives an incoming address ADDR issued from the processor 130 to obtain requested data $DATA_A$. Based on the address ADDR, the controller 106 performs a main tag (MTAG) matching detection (step 304). When a cache hit is detected using the decision logic shown in FIG. 2, the controller 106 directly fetches requested data $DATA_A$ from a cache line 112 associated with a main tag (i.e., one of the first entries 114) which indicates a cache hit (step 306). Next, the controller 106 returns the requested data $DATA_A$ to the processor 130 in response to the address ADDR (step 308).

When a cache miss is detected using the decision logic shown in FIG. 2 (step 304), the controller 106 performs a recycling tag (RTAG) matching detection (step 310). The operation of the RTAG matching detection is identical to the operation of the MTAG matching detection. Thus, when a cache hit is detected using the decision logic shown in FIG. 2, the controller 106 directly fetches requested data $DATA_A$ from a cache line 112 associated with a recycling tag (i.e., one of the second tag entries 116) which indicates a cache hit (step 306). Next, the controller 106 returns the requested data $DATA_A$ to the processor 130 in response to the address ADDR (step 308).

When a cache miss is detected using the decision logic shown in FIG. 2 during the RTAG matching detection (step 310), the controller 106 employs a replacement algorithm, such as a Least Recently Used (LRU) algorithm, to try to replace one of main tags in a set selected by the address ADDR (step 312). After a specific first tag entry 114 is selected by the controller 106 in step 312, the controller 106 checks the valid bit 122 of the specific first tag entry 114 to determine if a cache line associated with the specific first tag entry 114 contains valid data (step 314). If the valid bit 122 of the specific first tag entry 114 indicates that no valid data is stored in a cache line associated with the specific first tag entry 114, no cache line data recycling is needed. Thus, the flow proceeds with step 318. However, if the valid bit 122 of the specific first tag entry 114 indicates that valid data is stored in a cache line associated with the specific first tag entry 114, the proposed cache line data recycling scheme is activated. In this embodiment, the second tag entries 116 may be regarded as a duplicate of the first tag entries 116 when the second tag entries 116 serve as recycling tags. In step 316, the tag content stored in the tag field 128 of the specific first tag entry 114 is copied to the tag field 116 of a specific second tag entry 116 corresponding to the specific first tag entry 114, where the specific first tag entry 114 and the specific second tag entry 116 are both associated with the same cache line. Besides, the valid bit 122 of the specific second tag entry 116 is set by one value (e.g., '1') to indicate that the cache line associated with the specific second tag entry 116 contains valid data. In step 318, the tag field of the specific first tag entry 114 is updated by a new tag content derived from the address ADDR, and the pending bit 126 of the specific first tag entry 114 is set by one value (e.g., '1') to indicate that the cache line associated with the specific first tag entry 114 is waiting for requested data $DATA_A$ for the address ADDR that is fetched from the data storage device 140, and the specific first tag entry 114 therefore should not be used for MTAG matching detection. In step 320, the controller 106 fetches the requested data for $DATA_A$ the address ADDR from the data storage device 140.

Before the cache line associated with the specific first tag entry 114 is updated/overwritten by the requested data $DATA_A$ for the address ADDR, the original data is still maintained in the cache line associated with the specific first tag entry 114; besides, the original tag of the original data is copied to the specific second tag entry 116. As the data storage device 140 has a slower data access speed, fetching the requested data from the data storage device 140 may have a latency of hundreds of clock cycles. During this period in which the specific first tag entry 114 stays at a pending state, the original cache line data may be still useful and hit by one or more incoming addresses (step 310).

After the controller 106 receives the requested data $DATA_A$ fetched from the data storage device 140, the controller 106 sets the valid bit 122 of the specific second tag entry 116 to another value (e.g., '0') to disable the cache line data recycling for the cache line 112 associated with the specific first tag entry 114 (step 322). In step 324, the controller 106 sets the pending bit 126 of the specific first tag entry 114 by another value (e.g., '0'). In step 326, the controller 106 overwrites the original data stored in the cache line 112 associated with the specific first tag entry 114 by the requested data $DATA_A$ fetched from the data storage device 140. Next, the controller 106 returns the requested data $DATA_A$ to the processor 130 in response to the address ADDR (step 308).

Figure 4:
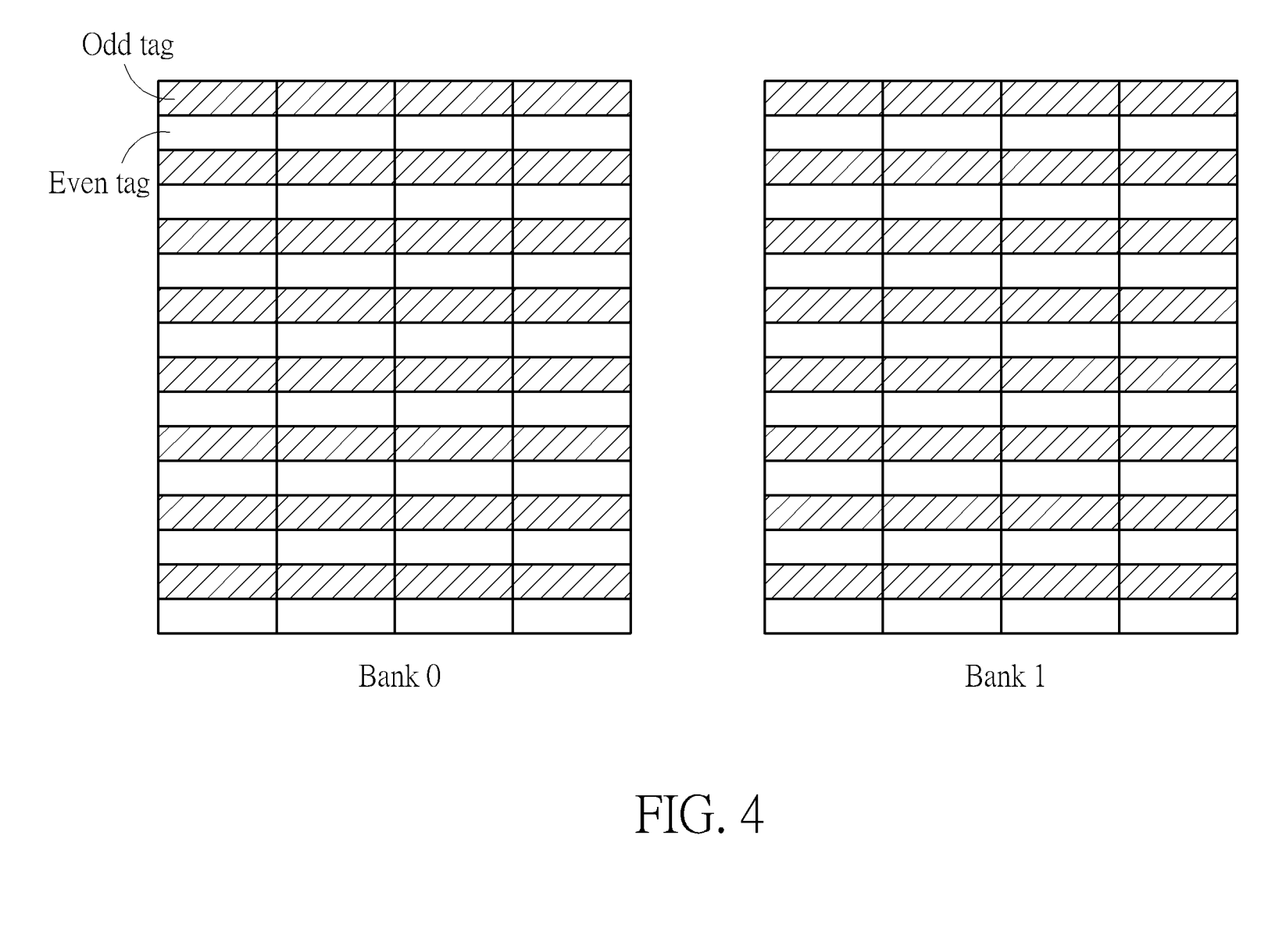
FIG. 4 is a diagram illustrating a first arrangement of tag entries within the tag storage device according to an embodiment of the present invention.

The first tag entries (e.g., even tags) 114 and the second tag entries (e.g., odd tags) 116 are allowed to be randomly distributed within the tag storage device 104. In practice, the first tag entries (e.g., even tags) 114 and the second tag entries (e.g., odd tags) 116 may be properly arranged in the tag storage device 104 for achieving better tag access efficiency. Please refer to FIG. 4, which is a diagram illustrating a first arrangement of tag entries within the tag storage device 104 according to an embodiment of the present invention. In this case, the tag storage device 104 has a first memory bank denoted by 'Bank 0' and a second memory bank denoted by 'Bank 1'. Each of the first bank and the second bank has first memory rows (e.g., even rows) and second memory rows (e.g., odd rows) arranged in an interleaving manner. In this embodiment, first tag entries 114 are stored in the first memory rows (e.g., even rows) only, and second tag entries 116 are stored in the second memory rows (e.g., odd rows) only. As shown in FIG. 4, each memory row in one memory bank is capable of storing 4 tag entries. Consider a case where the cache is 8-way set-associative. When the first tag entries 114 and the second tag entries 116 are all used as main tags due to a smaller cache line size (e.g., 64 bytes), 8 first tag entries 114 belonging to the same set should be read for tag comparison if this set is selected by the address ADDR, and 8 second tag entries 116 belonging to the same set should be read for tag comparison if this set is selected by the address ADDR. To reduce the fetching time of tag entries belonging to the same set, first tag entries 114 belonging to the same set are not stored in the same memory bank, and second tag entries 116 belonging to the same set are not stored in the same memory bank. In this way, the first memory bank and the second memory bank can be read concurrently such that a first half of required tag contents can be obtained from the first memory bank and a second half of the required tag contents can be obtained from the second memory bank at the same time. More specifically, the controller 106 can obtain the required main tags in one cycle.

Figure 5:
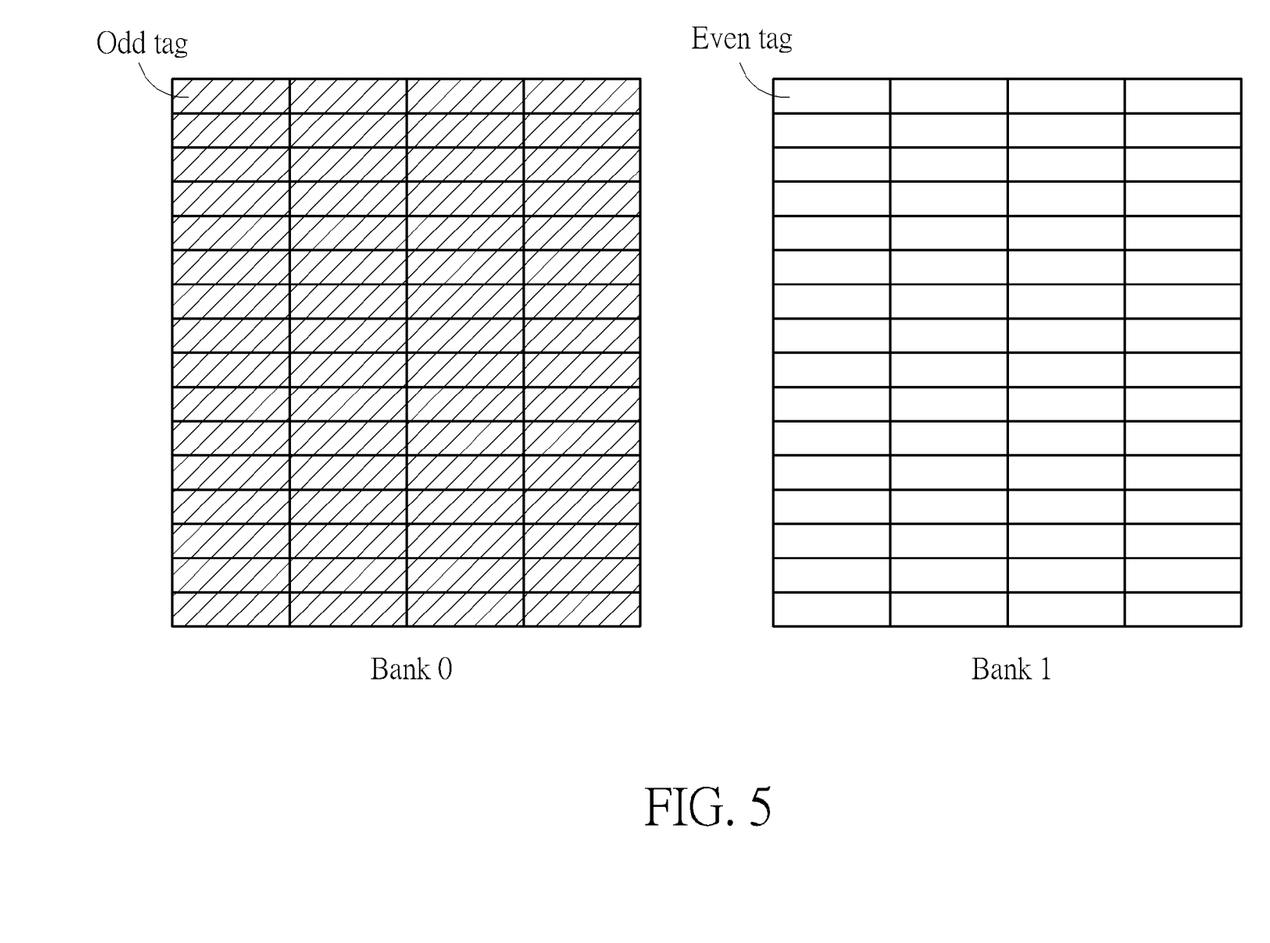
FIG. 5 is a diagram illustrating a second arrangement of tag entries within the tag storage device according to an embodiment of the present invention.

In above embodiment, the cache line size can be programmed by the controller 106 to have different values for different application/computing requirements. In the present invention, the controller 106 may also be designed to program a degree of associativity of the storage system 100. For example, based on different application/computing requirements, the storage system 100 may be programmed to be an N-way set-associative cache or an M-way set-associative cache, where M and N are different integers. Please refer to FIG. 5, which is a diagram illustrating a second arrangement of tag entries within the tag storage device 104 according to an embodiment of the present invention. As mentioned above, the tag storage device 104 has a first memory bank denoted by 'Bank 0' and a second memory bank denoted by 'Bank 1'. Consider a case where the aforementioned 8-way set-associative cache is programmed by the controller 106 to become 4-way set-associative. When the first tag entries 114 are used as main tags and the second tag entries 116 are used as recycling tags due to a larger cache line size (e.g., 128 bytes), 4 first tag entries 114 belonging to the same set should be read for tag comparison if this set is selected by the address ADDR (step 304), and 4 second tag entries 116 belonging to the same set should be read for tag comparison if this set is selected by the address ADDR (step 310). In this embodiment, each memory row of the first memory bank and the second memory bank is capable of storing 4 tag entries, the first tag entries 114 are stored in the second memory bank only, and the second tag entries 116 are stored in the first memory bank only. In this way, the main tags and the recycling tags can be read from the memory banks by the controller 106, concurrently.

In above example shown in FIG. 3, the concept of using recycling tags to recycle the cache line data is applied to the storage system 100 being a read cache. However, the same concept may be applied to the storage system 100 being a read/write cache. That is, any cache memory using the proposed recycling tag design falls within the scope of the present invention.

In summary, the proposed recycling tag design uses a recycling tag to associate with a cache line after a main tag associated with the cache line is changed due to a cache miss event and before the cache line is updated by requested data for an incoming address. Hence, the original data in the cache line may still be useful before read data overwriting. When another address is issued from the processor, the cache hit/miss test is first applied to main tags. When the cache hit/miss test applied to the main tags indicates a cache miss, the cache hit/miss test is applied to recycling tags to see whether there is a cache hit for reusing data of a phasing out cache line. Hence, the proposed recycling tag design is capable of increasing the hit rate and reducing the memory traffic. Specifically, when the memory latency is larger, there would be more memory traffic reduction resulting from the proposed recycling tag design. Besides, power consumption will be reduced when the memory access amount is reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A storage system, comprising:
a data storage device;
a tag storage device, comprising:
   a plurality of first tag entries, each associated with one data storage line allocated in the data storage device; and
   a plurality of second tag entries; and
a controller, coupled between the data storage device and the tag storage device, the controller arranged to set a specific second tag entry in the tag storage device to associate with a specific data storage line with which a specific first tag entry in the tag storage device is associated;
wherein the controller is further arranged to program a data storage line size of each data storage line allocated in the data storage device; and when the data storage line size is programmed by a first value, the first tag entries and the second tag entries are associated with a plurality of first data storage lines allocated in the data storage device, respectively; and when the data storage line size is programmed by a second value, only the first tag entries in the tag storage device are associated with a plurality of second data storage lines allocated in the data storage device, respectively.

2. The storage system of claim 1, wherein each of the first tag entries and the second tag entries has a tag field; and the controller copies an original tag content of the tag field of the specific first tag entry to the tag field of the second specific second tag entry, and then updates the tag field of the specific first tag entry by a new tag content.

3. The storage system of claim 2, wherein the controller selects the specific first tag entry from the first tag entries when determining that requested data for an address is not available in the data storage device, where the new tag content is a portion of the address.

4. The storage system of claim 3, wherein the specific first tag entry further includes a status bit; and the controller sets the status bit by a first value when the tag field of the specific first tag entry is updated by the new tag content, and then sets the status bit by a second value when the specific data storage line is updated by the requested data fetched from another data storage device.

5. The storage system of claim 3, wherein the specific second tag entry further includes a status bit; and the controller sets the status bit by a first value when the tag field of the second specific second tag entry stores the original tag content of the tag field of the specific first tag entry, and then sets the status bit by a second value when the specific data storage line is updated by the requested data fetched from another data storage device.

6. The storage system of claim 3, wherein before the specific data storage line is updated by the requested data for the address that is fetched from another data storage device, the controller fetches and outputs original data stored in the specific data storage line in response to another address when the specific second tag entry indicates that requested data for the another address is available in the specific data storage line.

7. The storage system of claim 1, wherein the second value is larger than the first value; and a number of the first data storage lines allocated in the data storage device is larger than a number of the second data storage lines allocated in the data storage device.

8. The storage system of claim 1, wherein the controller is further arranged to program a degree of associativity of the storage system.

9. The storage system of claim 1, wherein the tag storage device has a plurality of memory banks, each having first memory rows and second memory rows arranged in an interleaving manner; the first tag entries are stored in first memory rows of the memory banks only; the second tag entries are stored in second memory rows of the memory banks only; and first tag entries belonging to a same set are not stored in a same memory bank; and second tag entries belonging to a same set are not stored in a same memory bank.

10. The storage system of claim 1, wherein the tag storage device has a plurality of memory banks; the first tag entries are stored in one memory bank only; and the second tag entries are stored in another memory bank only.

11. The storage system of claim 1, wherein the data storage device is a read cache or a read/write cache.

12. A tag storage device, comprising:
a plurality of first tag entries, each associated with one data storage line allocated in a data storage device; and
a plurality of second tag entries;
wherein a specific second tag entry is set to associate with a specific data storage line with which a specific first tag entry is associated;
wherein when a data storage line size is set by a first value, the first tag entries and the second tag entries are associated with a plurality of data storage lines allocated in the data storage device, respectively; and when the data storage line size is set by a second value, only the first tag entries in the tag storage device are associated with a plurality of data storage lines allocated in the data storage device, respectively.

13. The tag storage device of claim 12, wherein each of the first tag entries and the second tag entries has a tag field; the tag field of the second specific second tag entry stores an original tag content of the tag field of the specific first tag entry; and the tag field of the second specific second tag entry stores a new tag content by overwriting the original tag content.

14. The tag storage device of claim 13, wherein the specific first tag entry further includes a status bit; and the status bit has a first value when the tag field of the specific first tag entry is updated by the new tag content, and then has a second value when the specific data storage line is updated by data corresponding to the new tag content.

15. The tag storage device of claim 13, wherein the specific second tag entry further includes a status bit; and the status bit has a first value when the tag field of the second specific second tag entry stores the original tag content of the tag field of the specific first tag entry, and then have a second value when the specific data storage line is updated by data corresponding to the new tag content.

16. The tag storage device of claim 12, wherein the second value is larger than the first value.

17. The tag storage device of claim 12, wherein the tag storage device has a plurality of memory banks, each having first memory rows and second memory rows arranged in an interleaving manner; the first tag entries are stored in first memory rows of the memory banks only; the second tag entries are stored in second memory rows of the memory banks only; first tag entries belonging to a same set are not stored in a same memory bank; and second tag entries belonging to a same set are not stored in a same memory bank.

18. The tag storage device of claim 12, wherein the tag storage device has a plurality of memory banks; the first tag entries are stored in one memory bank only; and the second tag entries are stored in another memory bank only.

* * * * *